US007178829B2

(12) United States Patent
Blackburn

(10) Patent No.: US 7,178,829 B2
(45) Date of Patent: Feb. 20, 2007

(54) INFLATOR AND METHOD OF ASSEMBLY

(75) Inventor: Jeffery S. Blackburn, Lake Orion, MI (US)

(73) Assignee: Autommotive Systems Laboratory, Inc., Armada, MI (US)

( * ) Notice: Subject to any disclaimer, the term of this patent is extended or adjusted under 35 U.S.C. 154(b) by 94 days.

(21) Appl. No.: 11/043,726

(22) Filed: Jan. 26, 2005

(65) Prior Publication Data

US 2005/0161925 A1 Jul. 28, 2005

Related U.S. Application Data

(60) Provisional application No. 60/539,488, filed on Jan. 27, 2004.

(51) Int. Cl.
*B60R 21/26* (2006.01)
(52) U.S. Cl. .................. 280/736; 280/741; 280/742
(58) Field of Classification Search ............. 280/736, 280/737, 741, 740, 742; 102/530, 531
See application file for complete search history.

(56) References Cited

U.S. PATENT DOCUMENTS

| 4,414,902 | A | * | 11/1983 | Strasser et al. | ............. | 102/531 |
|-----------|---|---|---------|-----------------|--------------|---------|
| 5,226,669 | A | * | 7/1993  | Honda           | ............. | 280/737 |
| 5,378,015 | A | * | 1/1995  | Rink et al.     | ............. | 280/736 |
| 5,547,217 | A | * | 8/1996  | Zelenak et al.  | ............. | 280/741 |
| 5,660,606 | A | * | 8/1997  | Adamini         | ............. | 55/337  |
| 5,820,160 | A | * | 10/1998 | Johnson et al.  | ............. | 280/736 |
| 5,924,727 | A | * | 7/1999  | Honda et al.    | ............. | 280/736 |
| 6,890,001 | B1| * | 5/2005  | Smith           | ............. | 280/736 |

FOREIGN PATENT DOCUMENTS

JP 9-86333 A * 3/1997

* cited by examiner

*Primary Examiner*—Ruth Ilan
(74) *Attorney, Agent, or Firm*—L.C. Begin & Associates, PLLC

(57) ABSTRACT

An inflator (10) for use in inflatable restraint systems. The inflator includes an inner body portion (12) defining a combustion chamber (20) and including one or more apertures (13) formed therealong to enable fluid communication between the combustion chamber (20) and an exterior of the combustion chamber. A filter material (14) is positioned along an exterior of the inner body portion (12), for filtering and cooling combustion products emanating from the apertures (13) of the inner body portion (12). An outer body wrap (16) is provided having a pair of opposed longitudinal edges (16a, 16b). The outer body wrap (16) is formed from a foldable sheet material and has a dimension between the opposed edges (16a, 16b) sufficient to enable the wrap (16) to substantially enclose the predetermined thickness of filter material (14) when the wrap (16) is folded about the filter material (14). One or more apertures (23) are provided along the outer body wrap (16) to enable fluid communication between the filter (14) and an exterior of the inflator (10). In one embodiment, the apertures (23) are formed along a seam extending between the opposed edges (16a, 16b) of the folded outer body wrap (16). Alternatively, the outer body wrap (16) may be pierced or punched to provide apertures therealong prior to folding of the wrap (16) about the filter material (14). The wrap (16) is folded about the filter material (14) to substantially enclose the filter material such that a predetermined thickness of the filter material is positioned intermediate the one or more inner body portion apertures (13) and the one or more outer body wrap apertures (23). The wrap (16) is then secured in the folded configuration using welding or other suitable means.

17 Claims, 3 Drawing Sheets

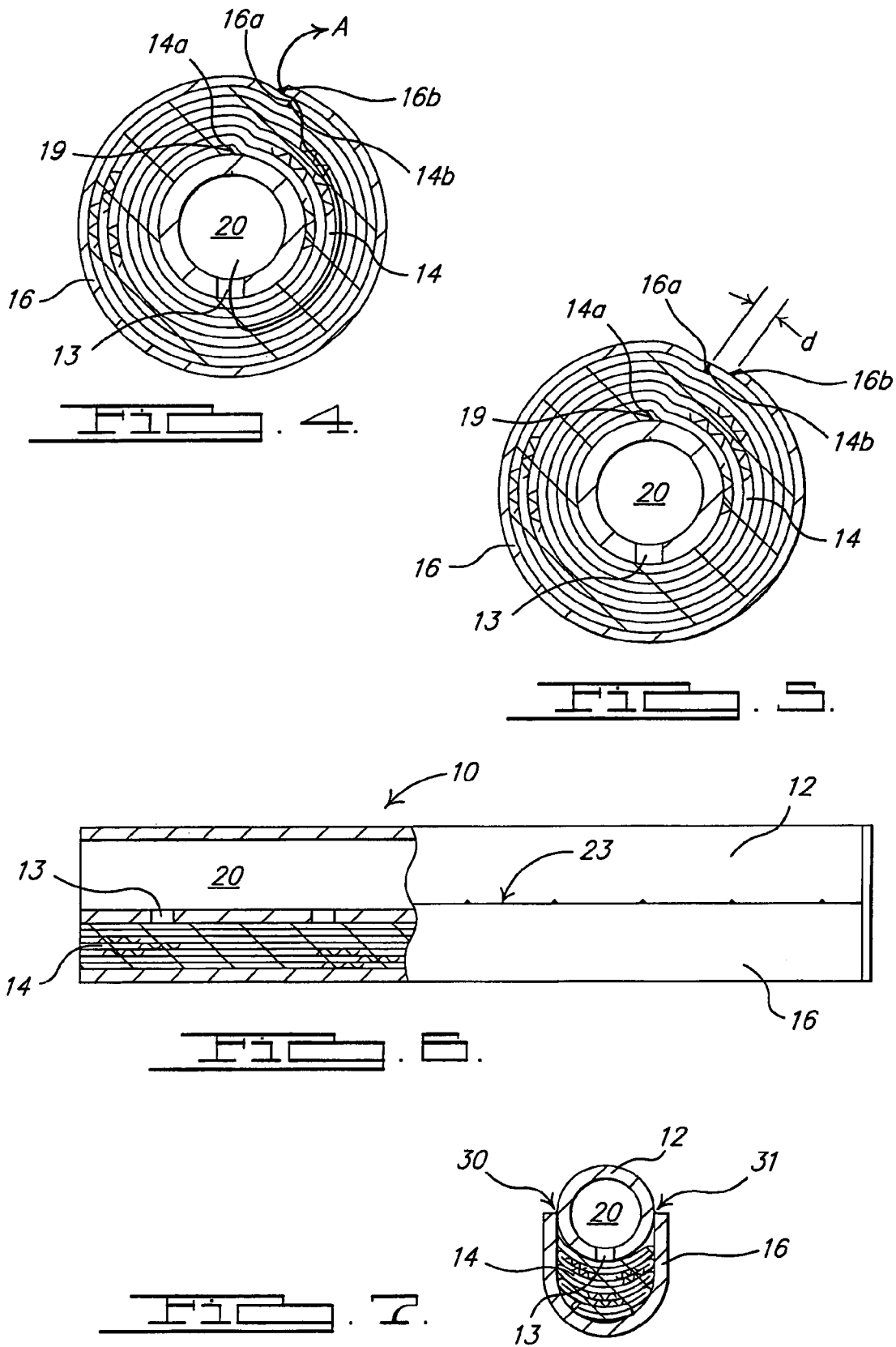

INFLATOR AND METHOD OF ASSEMBLY

CROSS REFERENCE TO RELATED APPLICATIONS

This application claims the benefit of provisional application Ser. No. 60/539,488 filed on Jan. 27, 2004.

BACKGROUND OF THE INVENTION

The present invention relates to inflators for vehicle airbags and, more particularly, to an inflator incorporating a multi-layered filter and an outer body wrap that substantially encloses the filter and is conformable to the thickness of the filter material.

Conventional inflators may include an inner tube defining a combustion chamber, a metallic mesh filter enclosing the inner tube for filtering combustion products, and an outer housing or tube enclosing the filter and the inner tube. The outer tube is generally a rigid cylindrical vessel which may be extruded, roll-formed and welded, or otherwise metal-formed from carbon steel, stainless steel, or aluminum. Generally, the outer tube is sized to conform to a predetermined envelope size for the inflator, or to accommodate a desired thickness of filter material between the inner body portion and the outer tube.

However, the outer tubes used in conventional designs tend to be rigid, relatively heavy and expensive. In addition, due to their rigidity, conventional outer tube designs are not necessarily adaptable to changes in the design of the other inflator components (for example, changes to the diameter of the inner tube, or changes to the type or thickness of filter material used.) Conventional rigid outer tube designs are also bulkier than is needed for functioning of the inflator, due to the need to provide internal clearance to allow for insertion of the filter material during inflator assembly.

SUMMARY OF THE INVENTION

In accordance with the present invention, an inflator is provided for use in inflatable restraint systems. The inflator includes an inner body portion defining a combustion chamber. The inner body portion includes one or more apertures formed therealong to enable fluid communication between the combustion chamber and an exterior of the combustion chamber. A filter material is positioned along an exterior of the inner body portion, for filtering and cooling combustion products emanating from the apertures of the inner body portion. An outer body wrap is provided having a pair of opposed longitudinal edges. The outer body wrap is formed from a foldable sheet material and has a dimension between the opposed edges sufficient to enable the wrap to substantially enclose the filter material when the wrap is folded about the filter material. One or more apertures are provided along the outer body wrap to enable fluid communication between the filter (enclosed within the outer body wrap) and an exterior of the inflator. In one embodiment, the apertures are formed along a seam extending between the opposed edges of the outer body wrap when the wrap is folded about the filter. Alternatively, the outer body wrap may be pierced or punched to provide apertures therealong prior to folding of the wrap about the filter material. The wrap is folded about the filter material to substantially enclose the filter material such that a predetermined thickness of the filter material is positioned intermediate the one or more inner body portion apertures and the one or more outer body wrap apertures. The wrap is then secured in the folded configuration using welding or other suitable means.

The inflator disclosed herein is constructed without a conventional rigid outer shell or housing, and is therefore significantly lighter, simpler, and more economically manufactured than earlier designs. Because there is no need to provide clearance in the outer body wrap to allow for insertion of the filter, the outer diameter of the inflator is less than that of many known inflator designs; accordingly, the inflator occupies less space in the vehicle. This allows for minimization of overall inflator size for a given filter mass. Also, by providing a wrapped filter design in which the outer body wrap can be easily tailored to conform to any desired filter thickness, the thickness of the filter can be easily varied to provide for differing inflator operating characteristics.

BRIEF DESCRIPTION OF THE DRAWINGS

In the drawings illustrating embodiments of the present invention:

FIG. 4 is a cross-sectional end view of the inflator shown in FIG. 3;

FIG. 5 is a cross-sectional end view of an inflator in accordance with a second embodiment of the present invention;

FIG. 6 is a partial cross-sectional side view of an inflator in accordance with a third embodiment of the present invention;

FIG. 7 is a cross-sectional end view of the inflator shown in FIG. 6;

DETAILED DESCRIPTION

Figure 1:
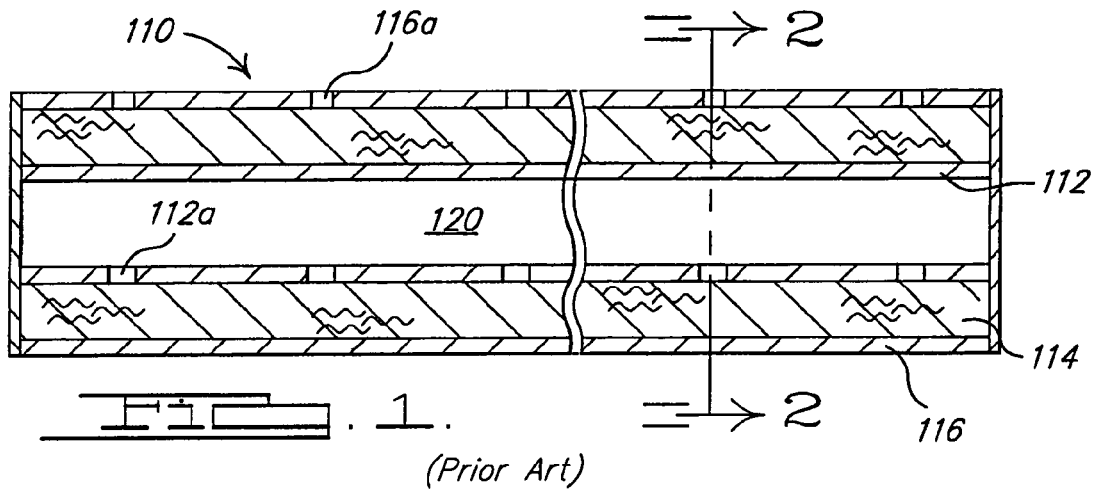
FIG. 1 is a cross-sectional side view of a prior art inflator design.
Figure 2:
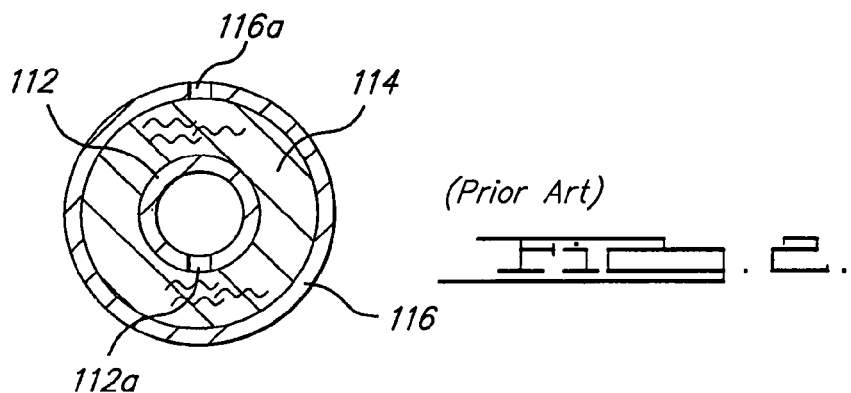
FIG. 2 is a cross-sectional end view of the inflator shown in FIG. 1.

FIGS. 1 and 2 illustrate side and end views of an inflator 110 according to a known design. Inflator 110 includes an inner tube 112 defining a combustion chamber 120. Inner tube 112 is surrounded by a metallic mesh filter 114 and outer tube 116. Outer tube 116 is generally a substantially rigid cylindrical vessel which may be extruded, roll-formed and welded, or otherwise metal-formed from carbon steel, stainless steel, or aluminum. A quantity of a gas generant composition (not shown) is positioned within combustion chamber 120, and an igniter (not shown) is operatively coupled to the inflator so as to enable fluid communication between the igniter and the gas generant composition upon activation of the igniter, thereby igniting the gas generant. Apertures 112a are formed along inner tube 112 to enable outflow of combustion products from combustion chamber 120 into filter 114. Also, apertures 116a are formed along outer tube 116 to enable outflow of combustion products from filter 114 to an exterior of inflator 110.

Figure 3:
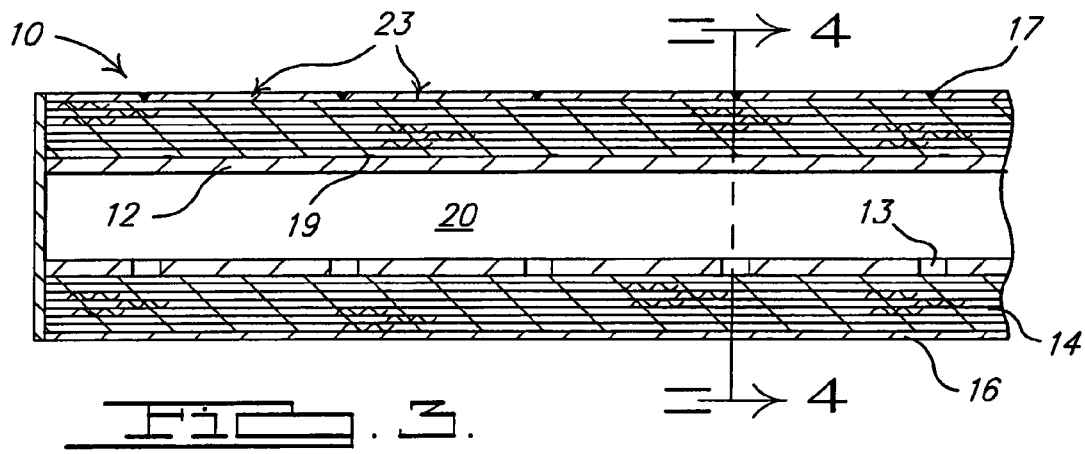
FIG. 3 is a cross-sectional side view of an inflator in accordance with a first embodiment of the present invention.

Referring to FIGS. 3 and 4, there is shown a gas generator or inflator 10 according to a first embodiment of the present invention, for use in inflatable restraint systems in motor vehicles. Inflator 10 comprises a tubular inner body portion 12, a rolled mesh filter 14 enclosing inner body portion 12, and an outer body wrap 16 wrapped about filter 14. Inflator 10 is manufactured from known materials and by known processes.

Inner body portion 12 is an elongate metal tube defining a combustion chamber 20 and including a plurality of apertures 13 formed longitudinally therealong to enable fluid communication between combustion chamber 20 and an exterior of the combustion chamber. Apertures 13 are illustrated in FIG. 3 as being positioned substantially in a line extending longitudinally along inner body portion 12; however, it should be appreciated that a variety of configurations and numbers of apertures might be used without departing from the scope of the present invention. For example, rather than a plurality of discrete apertures, one or more longitudinal slits (not shown) might be formed along inner body portion 12. Inner body portion 12 may be extruded, roll-formed and welded, or otherwise metal-formed from carbon steel, stainless steel, or aluminum.

Filter 14 preferably comprises a rollable metallic wire or carbon mesh sheet suitable for wrapping about inner body portion 12 during manufacturing of the inflator. Filter 14 has a pair of opposed longitudinal edges 14a and 14b. Filter 14 serves to remove particulate material produced during combustion of the gas generant in chamber 20, and also serves as a heat sink for the hot combustion gases produced thereby. Suitable metallic wire mesh material may be obtained, for example, from Wayne Wire Cloth Products of Bloomfield Hills, Mich., or from other commercial suppliers.

Outer body wrap 16 is preferably formed from a metallic flat sheet material. Outer body wrap 16 has a pair of opposed longitudinal edges 16a and 16b. Wrap 16 is folded about the exterior of filter 14 to enclose at least a portion of filter 14, and then welded or otherwise suitably secured in the folded position. One or more inflation gas exit apertures 23 are formed along wrap 16 to enable fluid communication between the portion of the inflator body enclosed by wrap 16 and an exterior of the inflator body. In a first embodiment, described in greater detail below, exit apertures 23 are formed when wrap 16 is folded and secured about inner body portion 12 and filter 14. In an alternative embodiment (not shown), the exit apertures comprise holes or perforations formed in wrap 16 (or along one or more of wrap edges 16a and 16b) prior to folding of the wrap about filter 14.

Inflator 10 includes one or more gas generant or propellant charges (not shown) positioned within combustion chamber 20. Any suitable gas generant composition may be used, and non-azide compounds are particularly preferred. Suitable (but non-limiting) gas generant compositions are set forth in U.S. Pat. Nos. 5,035,759, 5,872,329, 6,074,502, and 6,210,505, incorporated herein by reference. Inflator 10 also includes a conventional initiator or igniter assembly (not shown) positioned such that it can ignite the propellant charge in combustion chamber 20 in a conventional manner, upon activation of the inflator. A suitable (but non-limiting) igniter design is disclosed in U.S. Pat. No. 6,009,809, incorporated herein by reference.

Assembly of inflator 10 will now be discussed. Referring again to FIGS. 3 and 4, in a first embodiment, a leading edge 14a of filter sheet 14 (in an unrolled form) is aligned substantially longitudinally along an exterior surface of inner body portion 12. Filter sheet leading edge 14a is then welded or otherwise suitably secured to inner body portion 12 at a plurality of locations along a length of inner body portion 12. FIGS. 3 and 4 show weld points 19 whereby filter 14 is attached to inner body portion 12. Alternative methods (not shown) for securing filter edge 14a to inner body portion 12 include mechanical fasteners, adhesives, and other suitable known methods.

After securing filter leading edge 14a to inner body portion 12, filter 14 is repeatedly folded over on itself, around the exterior of inner body portion 12, until a desired predetermined thickness of filter material covers apertures 13 formed along inner body portion 12. A trailing edge 14b of filter sheet 14 is then welded or otherwise suitably secured to another, folded portion of the filter, as seen in FIG. 4. The desired thickness of filter 14 will vary based on a number of factors, including the selected propellant type and load. A relatively greater number of filter layers may be desirable for applications producing relatively large quantities of particulate matter during gas generant combustion, whereas a lesser number of filter layers may be desirable where relatively smokeless gas generants are used.

In an alternative embodiment (not shown), rather than welding filter leading edge 14a to inner body portion 12 at a plurality of locations, a substantially continuous weld is formed at a junction between filter edge 14a and inner body portion tube 12. In another alternative embodiment (not shown), rather than rolling filter 14 about inner body portion 12, filter 14 is pre-rolled into a filter sub-assembly and secured in the rolled position. The pre-rolled filter is then positioned about the exterior of inner body portion 12.

Referring again to FIGS. 3 and 4, after trailing edge 14b of filter sheet 14 is secured to the filter sheet, a leading edge 16a of outer body wrap 16 (in an unrolled form) is positioned against trailing edge 14b of rolled filter 14. Wrap 16 is then rolled about filter 14 until inner body portion 12 and filter 14 are substantially enclosed, and a trailing edge 16b of wrap 16 overlaps leading edge 16a of the wrap. Wrap 16 is then welded to itself along a longitudinally extending plurality of weld points 17. In the embodiment shown in FIGS. 3 and 4, the plurality of weld points 17 defines at least one unwelded seam section 23 extending between the welds and between overlapping edges 16a and 16b of the wrap. Upon activation of the inflator, inflation gas passes along the path indicated by arrow "A" (FIG. 4), out of combustion chamber 20 through apertures 13, through filter 14, between the overlapping edges 16a and 16b of wrap 16, through unwelded seam section(s) 23, and thence into an associated airbag (not shown).

Referring to FIG. 5, in an alternative embodiment, as well as leading edge 16a of wrap 16 being secured to filter material 14, trailing edge 16b of wrap 16 is also secured to filter 14 after the wrap has been rolled about filter 14. In this embodiment, a gap "d" is formed between opposite edges 16a and 16b of wrap 16 leaving an exposed portion of filter 14 between wrap edges 16a and 16b, thereby defining an inflation gas exit aperture 23 between edges 16a and 16b of wrap 16.

In yet another alternative embodiment (not shown), rather than leading edge 16a of outer body wrap 16 being simply positioned against filter trailing edge 14b, leading edge 16a of outer body wrap 16 is positioned against filter trailing edge 14b and then welded or otherwise suitably attached to filter 14 prior to wrap 16 being rolled about the filter.

Generally, filter 14 is folded around inner body portion 12, and outer body wrap 16 is folded around filter 14, such that at least a desired predetermined thickness of filter material resides between inner body portion apertures 13 and outer body wrap apertures 23 when wrap 16 is secured about the filter. This helps to ensure that inflation gases will pass through a desired amount of filter material prior to exiting the inflator. The steps of the assembly process set forth above can be performed with any suitable apparatus known in the art. The present invention also contemplates an inflator manufactured in accordance with one of the methods described above.

Operation of the inflator will now be discussed with reference to FIGS. 3 and 4. Upon a crash event, a signal from a crash sensor (not shown) is conveyed to an igniter operably coupled to inflator 10, thereby activating the igniter and igniting the gas generant positioned within combustion chamber 20. Upon activation of the inflator, inflation gas passes along the path indicated by arrow "A" (FIG. 4), out of combustion chamber 20 through apertures 13, through filter 14, between the overlapping edges 16a and 16b of wrap 16, through unwelded seam section(s) 23, and thence into an associated airbag (not shown).

The inflator disclosed herein is constructed without a conventional rigid outer shell or housing, and is therefore significantly lighter, simpler, and more economically manufactured than earlier designs. Because there is no need to provide clearance in the outer body wrap to allow for insertion of the filter, the outer diameter of the inflator is less than many known inflator designs; accordingly, the inflator takes up less space in the vehicle. This allows for a reduced overall inflator size for a given filter mass. Also, by providing a wrapped filter design in which the outer body wrap can be easily tailored to conform to any desired filter thickness, the thickness of the filter can be easily varied to provide for differing inflator operating characteristics.

Figure 8:
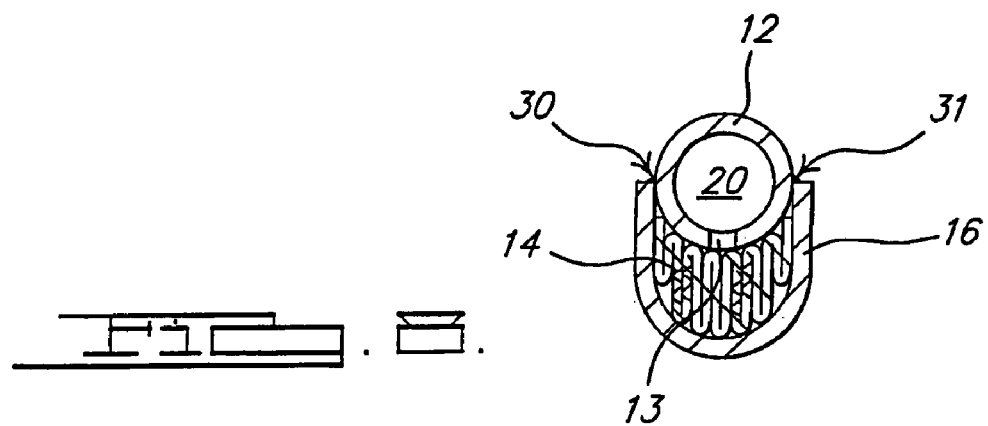
FIG. 8 is the view of FIG. 7 showing an alternative folding arrangement for filter material incorporated into the inflator shown therein.
Figure 9:
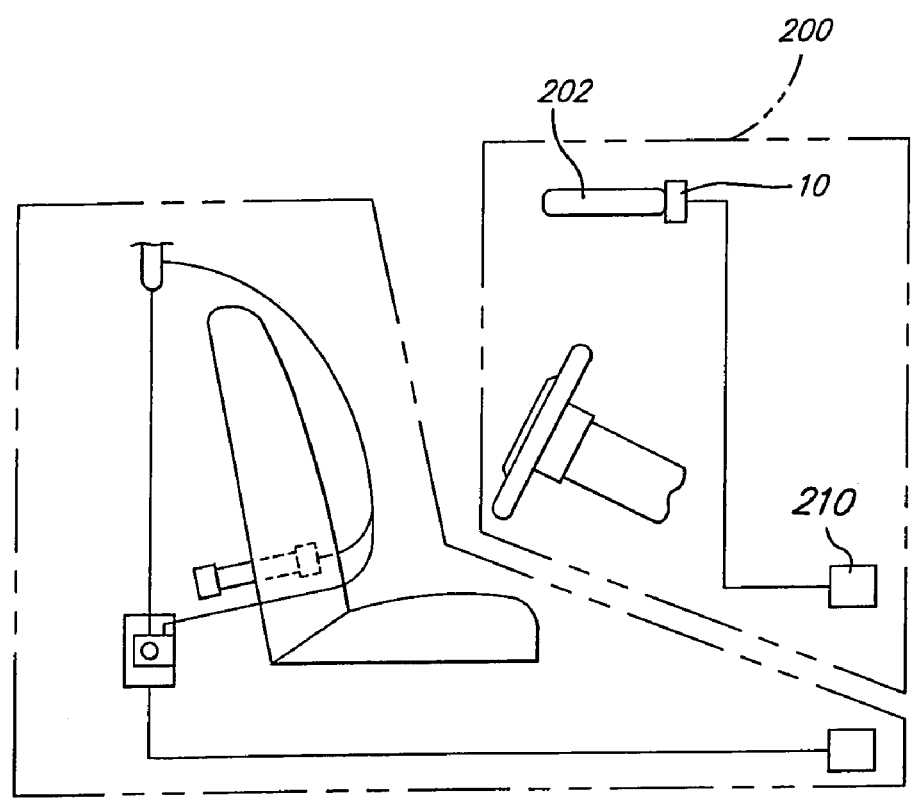
FIG. 9 is a schematic representation of an exemplary vehicle occupant restraint system incorporating an inflator in accordance with the present invention.

In other alternative embodiments, filter material 14 may be folded over upon itself in other ways to provide multiple layers of filter material extending between inner body portion apertures 13 and apertures 23 formed along outer body wrap 16. For example, referring to FIGS. 6–8, outer body wrap 16 may be attached directly to inner body portion 12 at multiple weld points 17 to form a pair of junctions 30 and 31 therebetween. In this embodiment, inflation gas exit apertures 23 are formed at one or more of junctions 30 and 31 between outer body wrap 16 and inner body portion 12. Prior to attachment of wrap 16 to inner body portion 12, filter sheet 14 may be folded as shown in FIGS. 6 and 7 to provide a desired thickness of filter material residing between inner body portion apertures 13 and outer body wrap apertures 23. FIG. 8 shows the embodiment of FIGS. 6 and 7 with an alternative folding arrangement for filter 14 within wrap 16.

Referring now to FIG. 8, an inflator 10 constructed in accordance with any of the embodiments described above may be incorporated into vehicle occupant restraint system, generally designated 200. FIG. 8 shows a schematic diagram of one exemplary embodiment of such a restraint system. Vehicle occupant restraint system 200 includes at least one airbag 202 and an inflator 10 coupled to airbag 202 so as to enable fluid communication with an interior of the airbag. Restraint system 200 may be operatively connected to a crash event sensor 210 operating in conjunction with a known crash sensor algorithm that signals actuation of restraint system 200 via, for example, activation of inflator 10 in the event of a collision.

It is contemplated that the present invention will find primary application in side impact or head curtain airbag systems; however, it is not limited thereto. It will also be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. An inflator comprising:
an inner body portion defining a combustion chamber, the inner body portion including at least one aperture formed therealong to enable fluid communication between the combustion chamber and an exterior of the combustion chamber;
a filter material positioned along an exterior of the inner body portion; and
an outer body wrap having at least a pair of opposed longitudinal edges and at least one aperture formed therealong to enable fluid communication between the filter material and an exterior of the inflator,
the outer body wrap being folded about the filter material to substantially enclose the filter material such that a predetermined thickness of the filter material is positioned intermediate the at least one inner body portion aperture and the at least one outer body wrap aperture,
wherein a first portion of the outer body wrap is attached to a second portion of the wrap at at least one point to define at least one unattached seam extending adjacent the at least one point and along which the first portion of the wrap is unattached to the second portion of the wrap, the unattached seam defining the at least one aperture formed along the outer body wrap to enable fluid communication between the filter material and the exterior of the inflator.

2. The inflator of claim 1 wherein the filter material is attached to the inner body portion.

3. The inflator of claim 2 wherein the filter material is attached to the inner body portion by welding.

4. The inflator of claim 1 wherein the outer body wrap is attached to the filter material.

5. The inflator of claim 4 wherein the outer body wrap is attached to the filter material along a first edge of the wrap.

6. The inflator of claim 5 wherein a second edge of the outer body wrap is attached to the filter material.

7. The inflator of claim 1 wherein the first portion of the outer body wrap is attached to the second portion of the wrap at a plurality of points to define at least one unattached seam extending between the plurality of points, the at least one unattached seam defining the at least one aperture formed along the outer body wrap to enable fluid communication between the filter material and the exterior of the inflator.

8. The inflator of claim 1 wherein multiple layers of the filter material are positioned between the at least one inner body portion aperture and the at least one outer body wrap aperture.

9. The inflator of claim 8 wherein the filter material is folded over upon itself to provide multiple layers of filter material extending between the at least one inner body portion aperture and the at least one outer body wrap aperture.

10. The inflator of claim 1 wherein the outer body wrap is attached to the inner body portion to form at least one junction therebetween.

11. The inflator of claim 10 wherein the at least one aperture formed along the outer body wrap is formed at the at least one junction between the inner body portion and the outer body wrap.

12. The inflator of claim 1 further comprising:
a quantity of a gas generant composition positioned in the combustion chamber; and an igniter positioned so as to enable fluid communication between the igniter and the gas generant composition upon activation of the igniter.

13. A method for manufacturing an inflator, the method comprising the steps of:
providing an inner body portion defining a combustion chamber, the inner body portion including at least one aperture formed therealong to enable fluid communication between the combustion chamber and an exterior of the combustion chamber;
providing a sheet of a filter material;
folding the sheet of filter material into a multi-layered structure and securing the filter material in a folded configuration;
positioning the filter material over the at least one inner body aperture to provide a multi-layered arrangement of filter material having a predetermined thickness and covering the at least one inner body aperture;
providing an outer body wrap having a pair of opposed longitudinal edges, the outer body wrap being formed from a foldable sheet material, the outer body wrap having a dimension between the opposed edges sufficient to enable the wrap to substantially enclose the filter material when the wrap is folded about the filter material;
folding the outer body wrap to substantially enclose the filter material; and
securing the outer body wrap in a folded configuration.

14. The method of claim 13 wherein the step of folding the outer body wrap comprises folding the outer body wrap so as to define at least one aperture along the wrap to enable fluid communication between the filter and an exterior of the inflator.

15. The method of claim 13 wherein the step of securing the outer body wrap in the folded position comprises connecting a portion of the outer body wrap to another portion of the outer body wrap.

16. An inflator manufactured in accordance with the method set forth in claim 13.

17. A vehicle occupant restraint system comprising:
at least one airbag; and
an inflator coupled to the airbag so as to enable fluid communication with an interior of the airbag upon activation of the inflator, the inflator including:
an inner body portion defining a combustion chamber, the inner body portion including at least one aperture formed therealong to enable fluid communication between the combustion chamber and an exterior of the combustion chamber;
a filter material positioned along an exterior of the inner body portion; and
an outer body wrap having at least a pair of opposed longitudinal edges and at least one aperture formed therealong to enable fluid communication between the filter material and an exterior of the inflator,
the outer body wrap being folded about the filter material to substantially enclose the filter material such that a predetermined thickness of the filter material is positioned intermediate the at least one inner body portion aperture and the at least one outer body wrap aperture,
wherein a first portion of the outer body wrap is attached to a second portion of the wrap at at least one point to define at least one unattached seam extending adjacent the at least one point and along which the first portion of the wrap is unattached to the second portion of the wrap the unattached seam defining the at least one aperture formed along the outer body wrap to enable fluid communication between the filter material and the exterior of the inflator.

* * * * *